Nov. 8, 1932.    C. L. ROWLAND    1,886,838
WELDING MACHINE
Original Filed Jan. 27, 1926    6 Sheets-Sheet 5
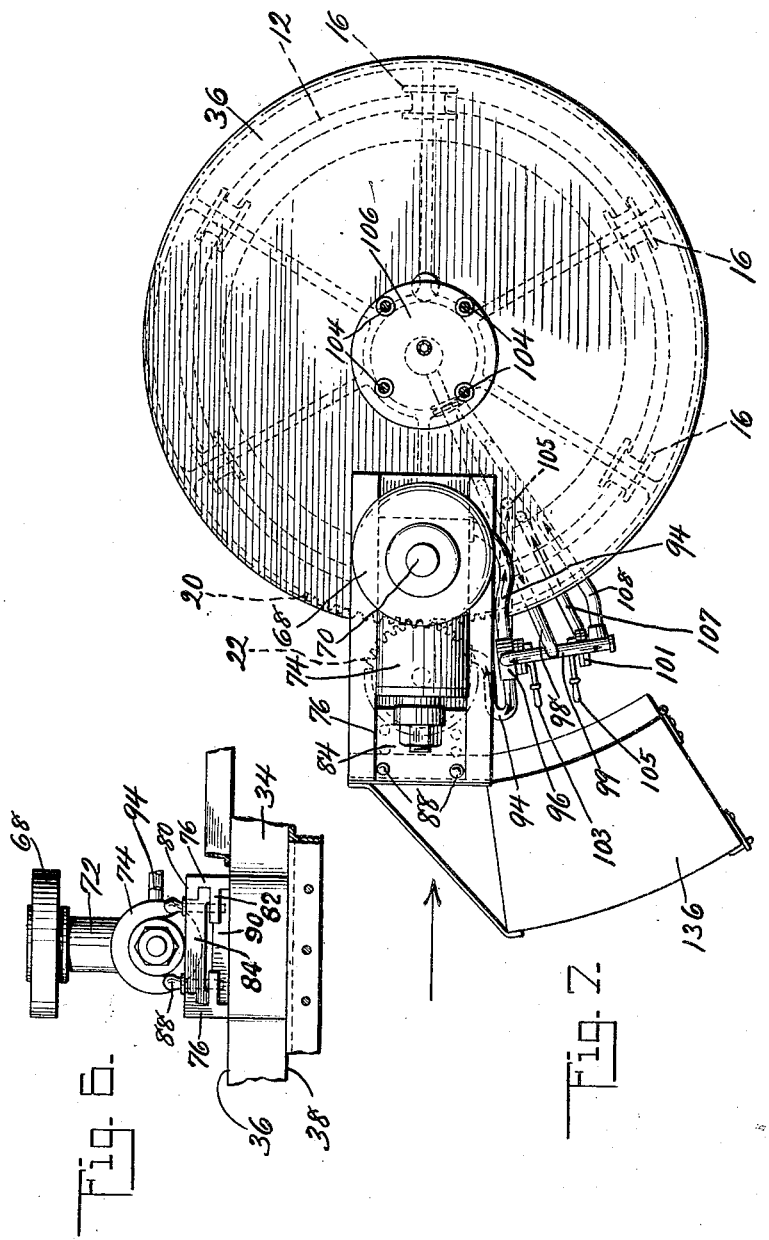
Inventor
Charles L. Roland, DECEASED.
Kathry E. Roland, EXECUTRIX.
Edward A. DeLaney, EXECUTOR.
By F. H. Gibbs
Attorney

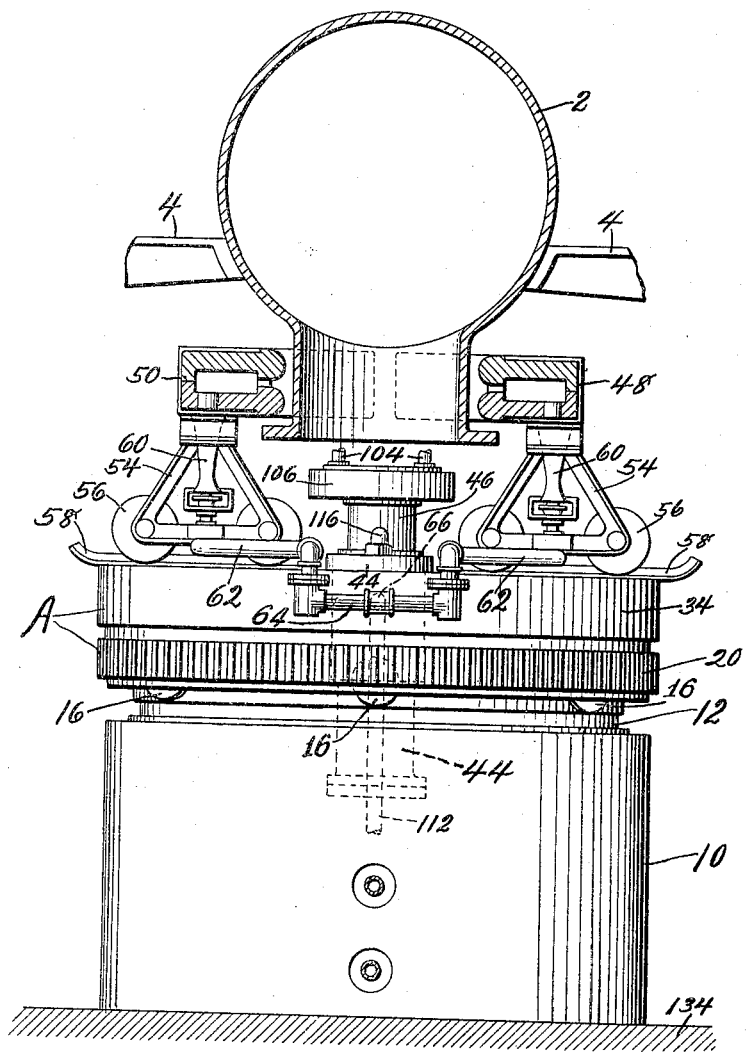

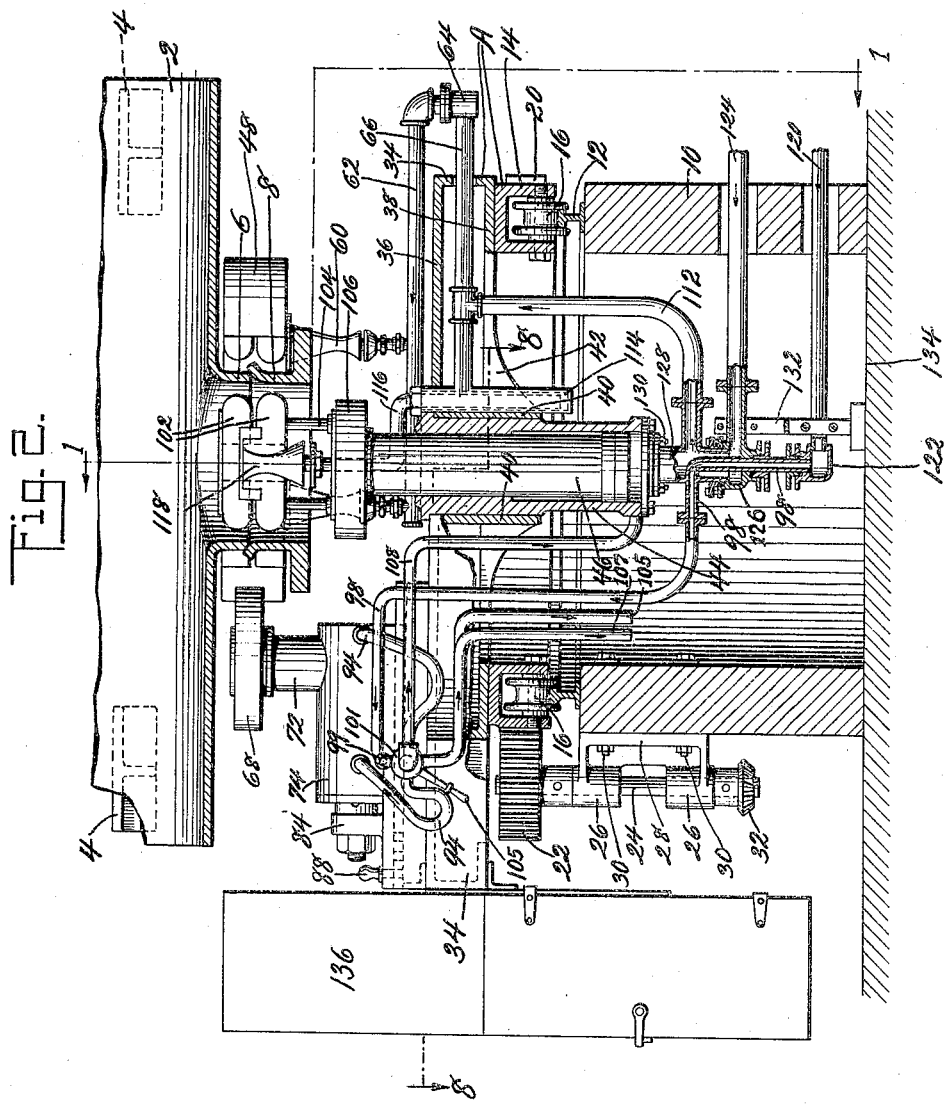

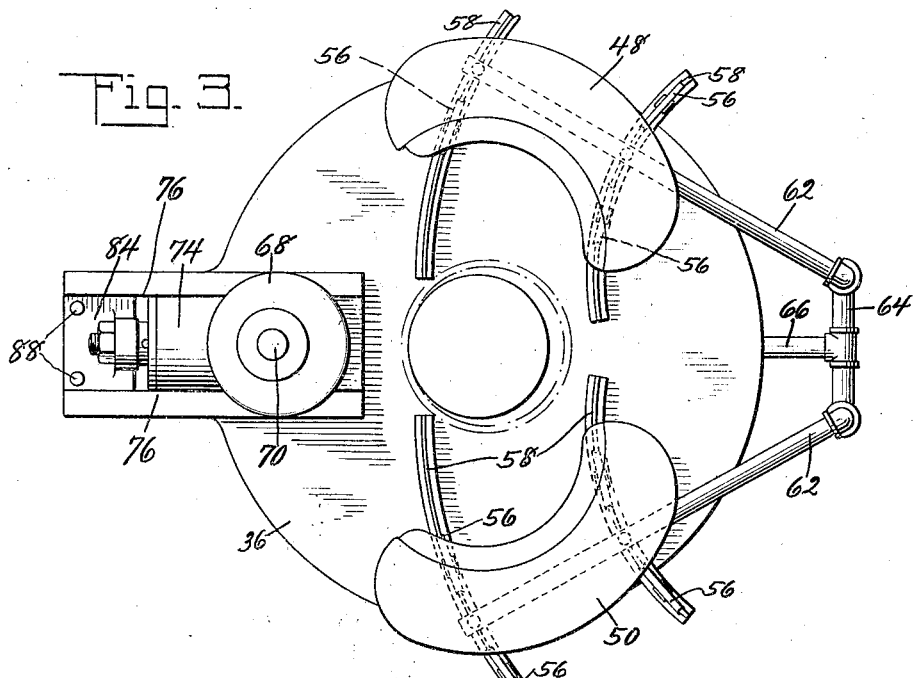
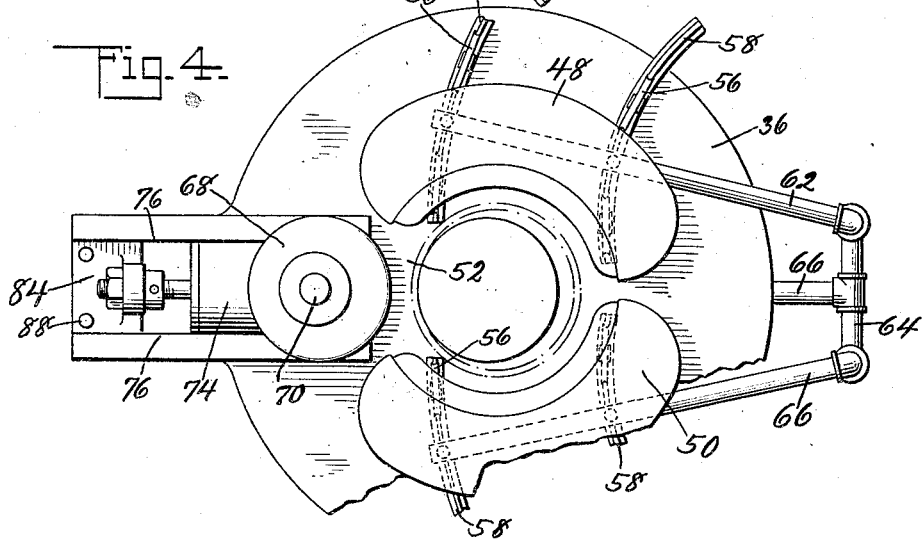

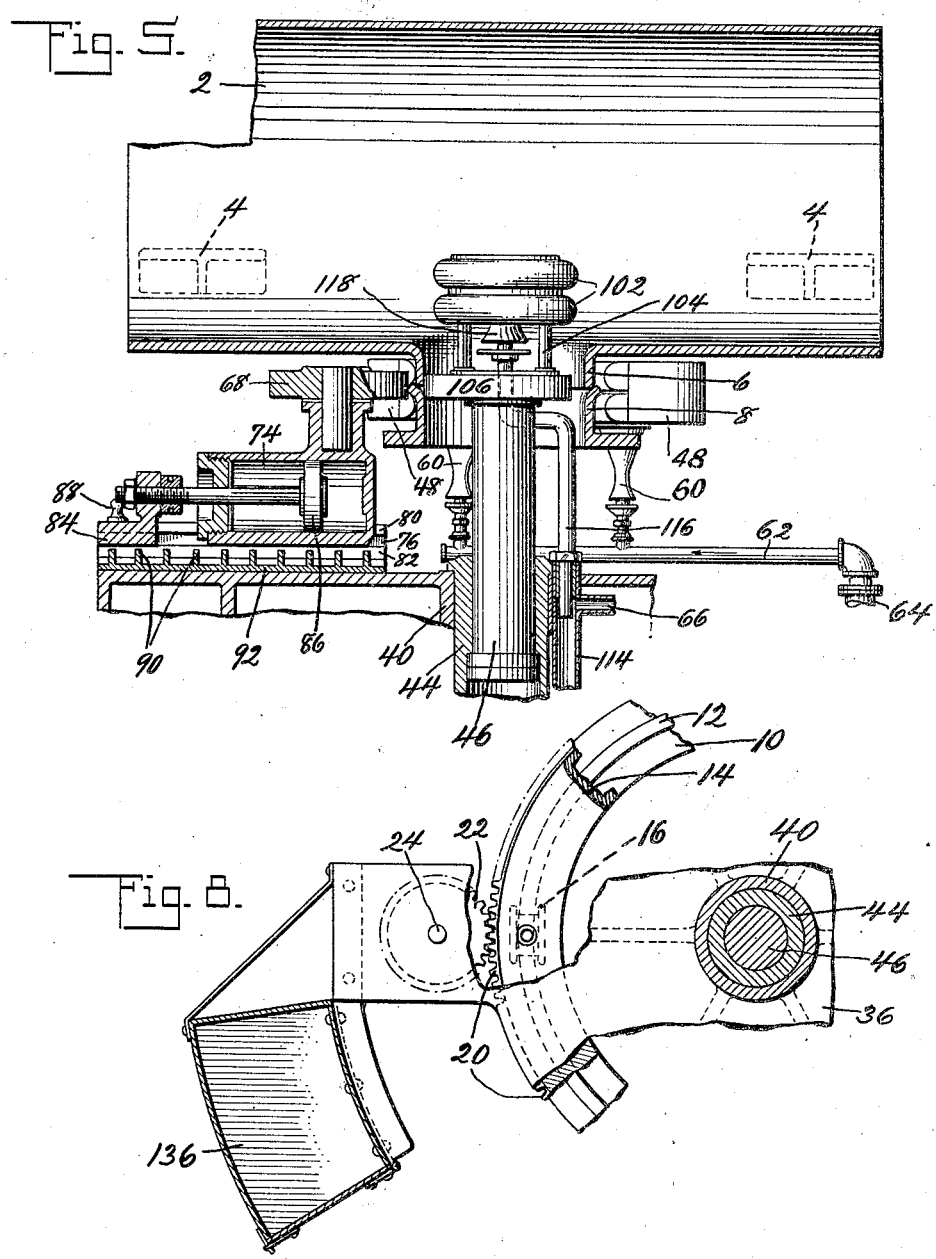

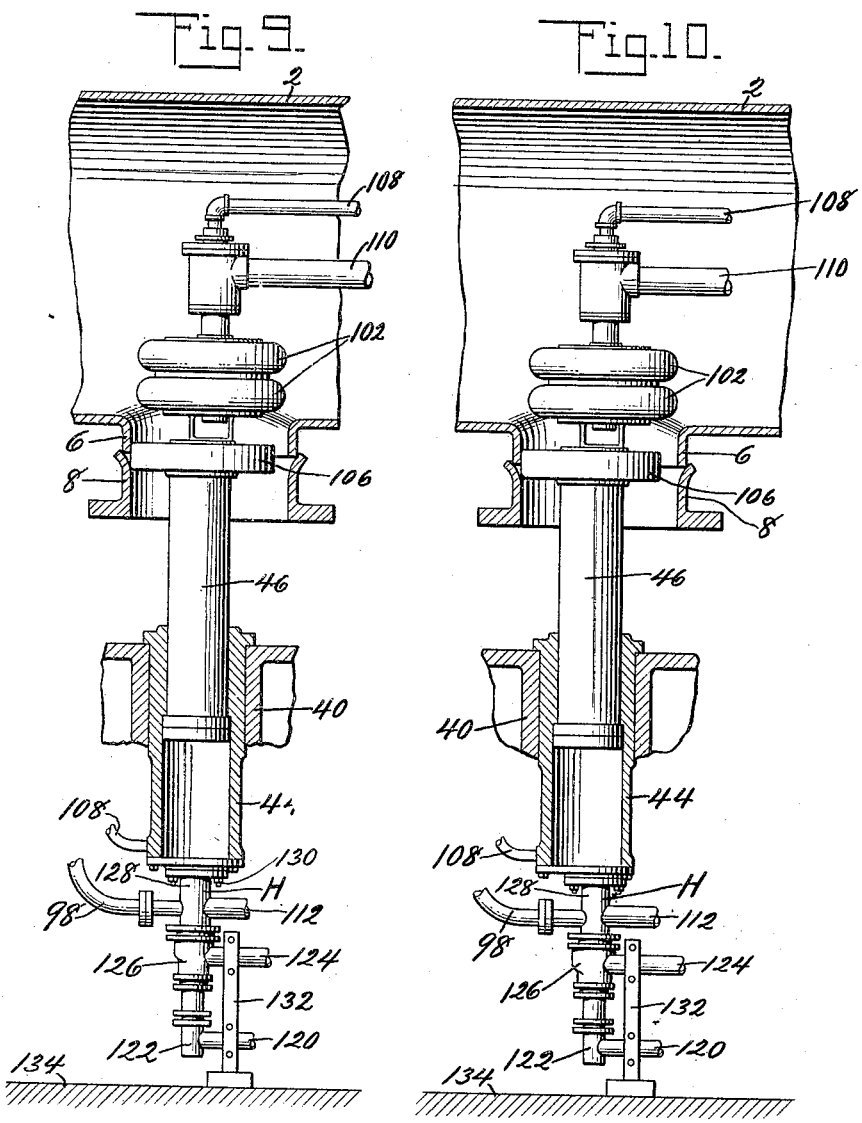

Patented Nov. 8, 1932

1,886,838

UNITED STATES PATENT OFFICE

CHARLES L. ROWLAND, DECEASED, LATE OF CARBONDALE, PENNSYLVANIA, BY KATHRYN E. ROWLAND, EXECUTRIX, OF CARBONDALE, PENNSYLVANIA, AND EDWARD A. DE LANEY, EXECUTOR, OF CARBONDALE, PENNSYLVANIA, ASSIGNOR TO AMERICAN WELDING COMPANY, OF CARBONDALE, PENNSYLVANIA, A CORPORATION OF DELAWARE

WELDING MACHINE

Original application filed January 27, 1926, Serial No. 84,134. Divided and this application filed April 29, 1930. Serial No. 448,253.

This invention relates generally to welding machines and has for one object the provision of means for welding a branch or neck at an angle to a pipe or tank, though obviously the invention shown is capable of use in other fields.

The present application is a division of a prior application Serial No. 84,134, filed January 27, 1926, allowed December 19, 1929, and contemplates the provision of a new and improved welding apparatus.

Another object of the invention is the provision of a welding machine having means for externally and internally heating parts to be welded together prior to the application of a welding tool.

A further object of the present invention is the provision of a new and improved type of furnace for heating parts to be welded.

Other objects and advantages of this invention will be apparent from the following description taken in conjunction with the accompanying drawings, in which:

Fig. 1 is an elevation of the device with certain parts being shown in section.

Fig. 2 is a vertical sectional view through the machine of the present invention; the view also showing work associated therewith.

Fig. 3 is a top plan view of the machine.

Fig. 4 is a top plan view of the machine with certain parts broken away; the view showing the furnaces in heating position.

Fig. 5 is a fragmentary view of a portion of the machine, certain parts being shown in section.

Fig. 6 is a detailed view of a portion of the machine, showing an end view of the welding roller and its mounting, the view being taken in the direction of the arrow in Fig. 7.

Fig. 7 is a top plan view of the machine with the furnace equipment removed.

Fig. 8 is a sectional view of the line 8—8, Fig. 2.

Fig. 9 is a fragmentary vertical sectional view through the center of the device, showing one specific arrangement of the pneumatic lift and the interior furnace equipment and welding roller, and Fig. 10 is a view similar to Fig. 9, but showing a modification of the parts in said Fig. 9.

Referring now more particularly to the drawings, the machine of the present invention is adapted to weld a neck or branch onto a tank, and referring to Fig. 1, a tubular element which may be a tank body is shown as the work, the same being indicated at 2 and being supported in a work holder 4 of any preferred or desired construction. The work holder is only illustrated fragmentarily and the tank 2 is shown as provided with an opening and a preformed annular flange 6 (see Fig. 2), to which latter a neck 8 is to be welded. Obviously the neck 8 and flange 6 are arranged in abutting relation and the neck 8 is supported in contact with the flange 6 in any suitable manner.

The machine of the present invention comprises a base 10 which is shown as tubular and cylindrical, and on the upper edge of said base a circular track 12 is mounted, on which latter the furnace equipment carrier indicated generally at A is mounted for rotation.

The carrier A is, in effect, a rotatable turret and includes an annular inverted channel 14 having rollers 16 journaled between the spaced flanges thereof, which rollers ride on the track 12 as shown clearly in Fig. 2. For rotating the carrier A a ring gear 20 is secured to the channel 14 to be engaged by a pinion 22 on the upper end of a shaft 24 supported in bearings 26 which are formed as parts of a bracket 28, bolted to the base as at 30; the shaft 24 being rotatable by a pinion 32 connected to any suitable source of power.

The annular channel 14 might be termed a turret truck, and secured thereto is the turret top 34 having an upper wall 36 and a supporting base 38; the wall 36 being provided with an opening and a depending flange 40 therearound. For stiffening purposes ribs 42 extend from the supporting base 38 to the flange 40 as shown clearly in Fig. 2. The flange 40 positions the cylinder 44 of a pneumatic lift having a ram 46, the purpose of which will be hereinafter more clearly pointed out.

Suitable exterior furnace equipment is provided, which, in the instance shown, comprises furnaces 48 and 50 respectively (see Figs. 3 and 4), which are segmental in shape and which, when in heat-applying position as shown in Fig. 4, surround the work; that is, they surround the flange 6 and neck 8 at the juncture or meeting edges thereof, as clearly shown in Fig. 2. The furnaces do not completely and entirely surround the work, but they substantially surround the work and leave an intervening gap 52. The furnaces are mounted on carriages 54, having rollers 56 adapted to travel on curved tracks 58 and have fuel nozzles 60 carried by the carriages and leading into the furnaces, (see Fig. 1). The tracks 58 are mounted on the upper wall 36 of the turret top 34 and the fuel nozzles 60 are connected to pipes 62 leading to a branch pipe 64 which latter is connected to a main fuel pipe 66; the connection of the pipes 62 with the branch 64 being a flexible one to permit shifting of the furnaces 48 and 50 and the pipes 62 with respect to said branch pipe 64.

Arranged in the plane of the gap 52 is an exterior welding tool comprising a roller 68 mounted on a shaft 70 supported in a lug 72 formed with a cylinder 74. The cylinder 74 is mounted for longitudinal shifting by being retained by the guides 76 secured to the top wall 36 of the turret top 34.

As shown clearly in Fig. 6 the guides 76 include upper flanges 80 and supporting flanges 82, and as shown in Fig. 5, the flanges 82 also support a slide 84, having a piston 86, which is arranged in the cylinder 74, and said piston may be shifted longitudinally for adjustment with respect to the cylinder on the flanges 82. For retaining the piston in a predetermined position pins 88 are provided, which extend through the slide 84 and project between upstanding flanges 90 formed in a base plate 92, which is arranged between the guides 76. It will be apparent from the description just given that by admitting fluid under pressure to either side of the piston 86, the roller 68 is moved toward or away from the work, and to permit the admission of fluid to the cylinder, the latter is provided with flexible hose connections 94 which lead to either side of the piston respectively. The connections 94 have their opposite ends connected to a four way valve 96 and receive fluid under pressure from a main intake pipe 98 which discharges into a header 99 leading to the valve 96 (see Fig. 7) and which also is connected to a valve 101. From the description just given it is apparent that operation of the valve lever 103 will admit fluid under pressure to either end of the cylinder as desired. Leading from the valve 96 is an exhaust pipe 105 whereby, when fluid under pressure is being admitted to one end of the cylinder, the fluid from the other end of the cylinder may be discharged from said cylinder into the exhaust pipe.

It has been found desirable to supply heat to the interior of hollow work such as shown in the drawings and in the present instance an interior furnace equipment and a welding member are mounted at the upper end of the ram 46. This construction is clearly shown in Fig. 2 and Figs. 9 and 10, which disclose modified constructions. The interior furnace is indicated at 102 and (in Fig. 2) it is shown as supported on rods 104 which are secured to the upper surface of an inner welding member 106. The member 106 may assume any preferred or desired form and is mounted on the upper end of the ram 46 in such a position that when the ram 46 is elevated to the position shown in Fig. 9 the member 106 will contact with the work at a point opposite the point of contact of the roll or welding member 68.

For elevating the ram 46 fluid under pressure is admitted to the lower end of the cylinder 44 through a pipe 108 which discharges below the lower end of the ram and which has its opposite end connected to the valve 101 which, as before mentioned, is adapted to receive fluid under pressure from the pipe 99. The valve 101 is provided with an operating lever 105 and is also provided with an exhaust pipe 107 whereby upon operation of the lever 105, the ram 46 may descend because of the fact that the fluid may escape from the pipe 108 back to the valve 101 and then out through the exhaust 107.

Fig. 2 discloses one form of the connection of the inner welding member 106. In Figs. 9 and 10 are shown modified forms of this arrangement. In Fig. 9 the inner welding member 106 is concentric with the ram 46 but the burners 102 are arranged eccentrically with respect to the welding member 106. In this construction the furnace 102 has fuel fed to it from the top through pipes 108 and 110 and it is to be understood that these pipes may be flexible or that suitable joints are formed in the connections in case the furnace revolves. In Fig. 10 substantially the same construction as shown in Fig. 9 is disclosed, the main difference being that the distributor heads H, hereinafter more particularly described, are offset with respect to the ram 46 and are in line with the furnace 102.

In the construction shown in Fig. 2 fuel for the burners 102 is received from the fuel pipe 112 which is connected to the pipe 66, one end of which latter is connected, as before mentioned, to the branch 64. The other end of pipe 66 leads to a cylinder 114 which telescopically receives one end of a pipe 116 the other end of which latter extends to a nozzle 118 which feeds the furnace 102. The burners 102 heat the entire inner circumference of the tubular work along the line to be welded. As before mentioned, the welding roller 106 contacts with the inner surface of the work at only one point and the contacting point is opposite the contacting point of the roller 68. This accounts for the specific arrangements of the roller 106 with respect to the ram 46 and the furnace 102 as pointed out more in detail hereinbefore.

The fuel and liquid may conveniently be brought into the apparatus by the following means. A water pipe 120 extends through the base 10 into a distributor head 122 to which latter the lower end of main in-take pipe 98 extends and with respect to which said pipe 98 is free to rotate. 124 indicates a gas fuel pipe which leads to a distributor head 126. The distributor head 126 is secured to the lower end of a fitting 128 bolted to the lower end of the cylinder 44, as shown at 130. The feed pipe 112 is connected to the fitting 128 as shown clearly in Fig. 2, and receives fuel from the pipe 124 which has passed into the distributor head 126. For supporting the pipes 120 and 124 and their associated distributor heads, a suitable bracket 132 is provided which is supported on the base 134 which, in the instance shown, is a floor or the like. From the description just given it is apparent that rotation of the turret will rotate the cylinder 44 and the pipes 98 and 112 are free to rotate also for the reason that the connections of the distributor heads 126 with the fitting 128 and the distributor head 122 with the lower end of pipe 98 is one which permits rotation.

Secured to the turret in any suitable manner is an operator's cage 136 which rotates with the turret.

In operation, the work to be acted on is placed in position on the work-holder and the neck 8 is temporarily supported in any desired manner. The welding members 68 and 106 are withdrawn from their welding positions and the exterior and interior furnaces are ignited and placed in position. The parts are then in the position indicated in Fig. 2. Rotation is now imparted to the carrier and the exterior and interior furnaces will be rotated whereby the work is heated at the juncture of the neck and flange 8 and 6 respectively. This continues until the work has reached a welding heat, when the valves 96 and 101 are operated to permit fluid under pressure to raise the ram 46 and to shift the cylinder 74 until the tool or roller 68 engages the work as shown in Fig. 5; the roller 68 extending into the gap 52 between the furnaces 48 and 50. Continued rotation of the carrier, it will be apparent, will cause the opposed welding tools 68 and 106 to act on the work in a manner such as shown in Fig. 5 to weld the neck and flange 8 and 6 respectively together, as shown clearly in Fig. 1. The rollers or welding tools are then withdrawn by manipulation of the valves 96 and 101 and the furnaces extinguished and rotation of the carrier stopped. Following this the exterior furnaces 48 and 50 may be swung to the position shown in Fig. 3 and the work withdrawn from its holder 4.

From the drawings and the above description it is believed that the device will be fully apparent to those skilled in the art, but it is to be understood that the drawings are for illustrative purposes only and various changes in the form and proportions of the machine may be made within the scope of the appended claims without departing from the spirit of the invention.

What is claimed is:

1. In a heating apparatus, in combination, a work holder to support hollow work, means for heating the work comprising an exterior furnace equipment surrounding the work, an interior furnace equipment within the work, and transmission devices to effect, during the heating action of said furnace equipments, a relative rotating movement between the exterior furnace equipment and the work holder one with relation to the other.

2. In a heating apparatus, in combination, a work holder to support hollow work, means for heating the work comprising an exterior furnace equipment surrounding the work, an interior furnace equipment within the work, and transmission devices to effect, with respect to the exterior and interior furnace equipments as one element and the work holder as another element, and during the heating action of said furnace equipments a relative rotating movement one with relation to the other.

3. In a heating apparatus, in combination, a work holder to support hollow work, means for heating the work comprising an exterior furnace equipment surrounding the work, an interior furnace equipment within the work, and transmission devices to effect, during the heating action of said furnace equipments, a rotating movement of the exterior furnace equipment with relation to the work holder.

4. In a heating apparatus, in combination, a work holder to support hollow work, means for heating the work comprising an exterior furnace equipment surrounding the work, an interior furnace equipment within the work, and transmission devices to effect, during the heating action of said furnace equipments, a rotating movement of the exterior and interior furnace equipments with relation to the work holder.

5. In combination, a furnace equipment comprising independent burners adapted to substantially surround the work to be welded, means for adjusting each of said burners relative to the work, rotatable means supporting said burners for rotation around the work, and an internal burner for heating the interior of the work.

6. In combination, a furnace equipment comprising independent burners adapted to substantially surround the work to be welded, means for horizontally adjusting each of said burners relative to the work, rotatable means supporting said burners for rotation around the work, and an internal burner for heating the interior of the work.

7. In combination, a furnace equipment comprising independent burners adapted to substantially surround the work to be welded, means for horizontally adjusting each of said burners relative to the work, rotatable means supporting said burners for rotation around the work, and a vertically adjustable internal burner.

8. In combination, a furnace equipment comprising a multi-part heating unit for heating the exterior surface of the work, said unit substantially surrounding the work and the parts thereof being individually adjustable to vary the heating action of said unit, a second heating unit extending into the work and vertically adjustable relative thereto, and transmission devices for effecting rotation of the multi-part heating unit around the work.

9. In combination, a furnace equipment comprising a multi-part heating unit for heating the exterior surface of the work, said unit substantially surrounding the work and the parts thereof being individually adjustable to vary the heating action of said unit, a second heating unit extending into the work and vertically adjustable relative thereto, and transmission devices for effecting rotation of the multi-part heating unit and the second heating unit relative to the work.

10. In combination, a furnace equipment comprising a multi-part heating unit for heating the exterior surface of the work, said unit substantially surrounding the work and the parts thereof being individually adjustable to vary the heating action of said unit on the work, a second heating unit for the interior of the work, rotatable supporting means for said multi-part heating unit to effect rotation of said unit around the work, and vertically adjustable supporting means for said second heating unit for positioning the latter relative to the work.

11. In combination, a furnace equipment comprising a multi-part heating unit for heating the exterior surface of the work, said unit substantially surrounding the work and the parts thereof being individually adjustable to vary the heating action of said unit on the work, a second heating unit for the interior of the work, rotatable supporting means for said heating units for effecting rotation thereof around the work, and vertically adjustable supporting means for said second heating unit for positioning the latter relative to the work.

12. In combination, a rotatable turret, spaced pairs of tracks on said turret, a pair of burners, carriages on which said burners are mounted adapted to travel on said tracks, and fuel connections extending to the burners.

13. In combination, a rotatable turret, spaced pairs of tracks on said turret, a pair of burners, carriages on which said burners are mounted adapted to travel on said tracks, and fuel connections extending to the burners, said connections being movable with the turret.

14. In combination, a work holder, a turret, and means for heating the work comprising a pair of burners adapted to surround the work, carriages on which the burners are mounted, tracks for the carriages and on which the latter are individually horizontally shiftable toward and away from the work, and fuel pipes for the burners.

15. In combination, a work holder, a turret, tracks on the turret, a pair of burners movable on the tracks and adapted to surround the work, a lift carried by the turret, a burner supported by the lift and adapted to be elevated relative to the work by said lift, fuel connections leading to the burners, and transmission devices to effect rotation of said turret and burners with respect to the work.

16. In combination, a holder for supporting the work, a turret, tracks on the turret, a pair of burners individually shiftable on the tracks for varying the heating position of said burners relative to the work, a lift carried by the turret, a burner suported by the lift and adapted to be vertically adjusted relative to the work by said lift, and transmission devices to effect rotation of the turret and burners relative to the work.

17. In combination, a work holder, a turret, an interior furnace carried by the turret and adapted to be vertically adjusted relative to the work, and exterior furnace equipment supported by the turret and shiftable horizontally thereon to vary the position of said exterior furnace equipment relative to the work.

18. In combination, means for supporting hollow work, a turret, and interior furnace equipment supported by the turret, a multipart exterior furnace equipment carried by the turret, means mounted on the turret and to which exterior furnace equipment is connected for shifting the parts of said exterior furnace equipment horizontally on the turret, and transmission devices for rotating the turret and furnace equipments relative to the work.

19. A heating apparatus comprising a work holder, a rotatable turret adjacent the work holder, curved tracks on said turret, segmental-shape furnaces movable on said tracks, a flexible fuel connection carried by said turret to feed the furnaces, a fuel connection extraneous of the turret, and a joint between the fuel connections carried by and extraneous of the turret to effect rotation of the latter.

20. A heating apparatus comprising a work holder, a rotatable carrier adjacent the work holder, a furnace equipment on the carrier to surround the work, a fuel connection also on the carrier to feed the furnace equipment, a fuel connection extraneous of the carrier, and a joint between the fuel connections carried by and extraneous of the carrier to effect rotation of the latter.

21. A heating apparatus comprising a work holder, a rotatable carrier adjacent the work holder, an exterior furnace equipment on the carrier and adjustable thereon toward and away from the work on the work holder, a flexible fuel connection on said carrier to feed the furnace equipment, a fuel connection extraneous of the carrier, and a joint between the fuel connections carried by and extraneous of the carrier to effect rotation of the latter.

In witness whereof, we have hereunto set our hands.

KATHRYN E. ROWLAND,
*Executrix.*
EDWARD A. DE LANEY,
*Executor. Charles L. Rowland, Deceased.*